United States Patent
Nomura et al.

(10) Patent No.: US 8,068,203 B2
(45) Date of Patent: Nov. 29, 2011

(54) LIQUID CRYSTAL DISPLAY DEVICE HAVING A FIRST AXIS EXTENDING ORTHOGONAL TO AN OPTICAL AXIS OF A POLARIZING PLATE AND A SECOND AXIS EXTENDING ORTHOGONAL TO THE FIRST AXIS, AND WITH SLIT ELECTRODES SYMMETRIC RESPECTIVELY TO FIRST AND SECOND AXISES

(75) Inventors: Shinichiro Nomura, Tottori (JP); Hideki Kaneko, Tottori (JP); Masahiro Horiguchi, Tottori (JP)

(73) Assignee: Sony Corporation, Tokyo (JP)

( * ) Notice: Subject to any disclaimer, the term of this patent is extended or adjusted under 35 U.S.C. 154(b) by 357 days.

(21) Appl. No.: 12/362,516

(22) Filed: Jan. 30, 2009

(65) Prior Publication Data

US 2009/0244467 A1  Oct. 1, 2009

(30) Foreign Application Priority Data

Mar. 27, 2008 (JP) .................................. 2008-082821

(51) Int. Cl.
 *G02F 1/1335* (2006.01)
 *G02F 1/1343* (2006.01)
(52) U.S. Cl. ........ 349/141; 349/142; 349/143; 349/144; 349/96

(58) Field of Classification Search .................... 349/96, 349/141–146
See application file for complete search history.

(56) References Cited

U.S. PATENT DOCUMENTS

| 6,992,743 | B2 * | 1/2006 | Sasabayashi | 349/143 |
| 7,342,629 | B2 * | 3/2008 | Yoshida et al. | 349/130 |
| 2011/0013129 | A1 * | 1/2011 | Jeong et al. | 349/141 |

FOREIGN PATENT DOCUMENTS

| JP | 2003-233083 | 8/2003 |
| JP | 2007-264231 | 10/2007 |

* cited by examiner

*Primary Examiner* — Huyen Ngo
(74) *Attorney, Agent, or Firm* — K&L Gates LLP

(57) ABSTRACT

A liquid crystal display device includes two substrates, liquid crystal therebetween, and sub-pixel regions. Each sub-pixel region is divided into first to fourth display regions by a first axis extending orthogonal to an optical axis of a polarizing plate and a second axis extending orthogonal to the first axis. Each first to fourth display region includes slit electrodes on the second electrodes along the first axis. First slit electrodes in the first display region and second slit electrodes in the second display region are symmetric relative to the first axis. Third slit electrodes in the third display region and fourth slit electrodes in the fourth display region are symmetric relative to the first axis. The first and fourth slit electrodes are symmetric relative to the second axis. The second and third slit electrodes are symmetric relative to the second axis.

4 Claims, 7 Drawing Sheets

PRIOR ART

LIQUID CRYSTAL DISPLAY DEVICE HAVING A FIRST AXIS EXTENDING ORTHOGONAL TO AN OPTICAL AXIS OF A POLARIZING PLATE AND A SECOND AXIS EXTENDING ORTHOGONAL TO THE FIRST AXIS, AND WITH SLIT ELECTRODES SYMMETRIC RESPECTIVELY TO FIRST AND SECOND AXISES

BACKGROUND

1. Technical Field

The present invention relates to a liquid crystal display device and an electronic apparatus.

2. Related Art

A method for controlling alignment of liquid crystal molecules by applying an electric field to a liquid crystal layer in a direction of a substrate surface is known (hereinafter referred to as a "lateral electric field method"). Examples of the lateral electric field method include an IPS (In-Plane Switching) method and an FFS (Fringe-Field Switching) method. Japanese Unexamined Patent Application Publication Nos. 2003-233083 and 2007-264231 disclose liquid crystal display devices employing the FFS methods, and in particular, disclose methods for attaining wide view angles using pixel electrodes having multi domain configurations.

Referring to FIG. 9, each of the liquid crystal display devices disclosed in Japanese Unexamined Patent Application Publication Nos. 2003-233083 and 2007-264231 includes slit electrodes each of which is constituted by bending a pixel electrode at the center thereof so as to have a V shape in a plan view. Each of the slit electrodes includes a first slit electrode which is an upper-half portion of the pixel electrode and a second slit electrode which is a lower-half portion of the pixel electrode. The first and second slit electrodes are arranged symmetrically with respect to an arrangement axis AX extending in a horizontal direction. A rubbing direction of an alignment film (alignment controlling direction) is substantially orthogonal to the arrangement axis AX, and an optical axis of a polarizing plate (for example, a transmission axis) is substantially parallel to the rubbing direction of the alignment film.

In the vicinity of the slit electrodes, lateral electric fields are generated in directions orthogonal to directions in which the slit electrodes extend. Liquid crystal molecules rotate within a substrate horizontal plane from the rubbing direction to directions of the electric fields. In a first display region including the first slit electrode, the direction of the electric field intersects with the rubbing direction so as to make an acute angle with the rubbing direction in a counterclockwise direction, and therefore, a liquid crystal molecule corresponding to the first slit electrode rotates in the counterclockwise direction. On the other hand, in a second display region including the second slit electrode, the direction of the electric field intersects with the rubbing direction so as to make an acute angle with the rubbing direction in a clockwise direction, and therefore, a liquid crystal molecule corresponding to the second slit electrode rotates in the clockwise direction. Since the rotation direction of the liquid crystal molecule of the first slit electrode is different from the rotation direction of the liquid crystal molecule of the second slit electrode, view-angle compensation is performed within a plane of the single pixel electrode. Accordingly, display with wide view angle is attained.

In FIG. 9, it is an ideal that the optical axis of the polarizing plate is parallel to the rubbing direction of the alignment film. However, in some cases, the rubbing direction could be tilted with respect to the optical axis of the polarizing plate depending on alignment accuracy of a rubbing device, for example. For example, as shown in FIG. 9, when the rubbing direction is tilted with respect to the optical axis of the polarizing plate by an angle $\theta_R$ in the clockwise direction, the liquid crystal molecule included in the first display region rotates in the direction of the electric field across the optical axis of the polarizing plate. Therefore, when the liquid crystal molecule is arranged in parallel to the optical axis of the polarizing plate, a dark image is displayed, that is, brightness of the image is deteriorated. On the other hand, since the liquid crystal molecule included in the second display region does not rotate across the optical axis of the polarizing plate, brightness of an image increases in proportion to a magnitude of an applied voltage. Accordingly, the brightness of the first display region becomes different from the brightness of the second display region. Therefore, in particular, in a case where halftone display is performed, unevenness of brightness could be recognized. This problem becomes larger as sizes of pixel electrodes become larger in accordance with increase of a size of the liquid crystal display device.

Note that although the liquid crystal display device employing the FFS method is described with reference to FIG. 9, the problem described above also arises in liquid crystal display devices employing the IPS methods. An example of the liquid crystal display devices employing the IPS methods includes pixel electrodes and a common electrode which are constituted by a plurality of slit electrodes (interdigital electrodes) arranged so that the pixel electrodes are meshed with the common electrode. Therefore, by bending the individual slit electrodes of the pixel electrodes and the common electrode into V shapes, a wide view angle is attained. However, in this case also, the problem described above with reference to FIG. 9 arises due to displacement between the rubbing direction and the optical axis of the polarizing plate.

SUMMARY

An advantage of some aspects of the invention is to provide a liquid crystal display device in which deterioration of display generated due to displacement between an optical axis of a polarizing plate and an alignment controlling direction of an alignment film is prevented and an electronic apparatus including the liquid crystal display device.

According to an embodiment of the invention, there is provided a liquid crystal display device including a pair of substrates which face each other, a liquid crystal layer interposed between the substrates, and a plurality of sub-pixel regions. One of the substrates includes first electrodes arranged on a liquid crystal display side in the sub-pixel regions, second electrodes arranged on the first electrodes through insulation films so as to face the first electrodes, and a first alignment film arranged on a surface of the substrate which contacts the liquid crystal layer. The other of the substrates includes a polarizing plate arranged on a surface far from the liquid crystal layer, and a second alignment film arranged on a surface of the substrate which contacts the liquid crystal layer. Each of the sub-pixel regions is divided into first to fourth display regions by a first axis which extends orthogonal to an optical axis of the polarizing plate and a second axis which extends orthogonal to the first axis. Each of the first to fourth display regions includes a plurality of slit electrodes arranged on the second electrodes along the first axis. Among the plurality of slit electrodes, first slit electrodes included in the first display region and second slit electrodes included in the second display region are symmetrically arranged with respect to the first axis, and third slit electrodes included in the third display region and fourth slit electrodes included in the fourth display region are symmetrically arranged with respect to the first axis. The first slit electrodes and the fourth slit electrodes are symmetrically arranged with respect to the second axis, and the second slit electrodes and the third slit electrodes are symmetrically arranged with respect to the second axis.

With this configuration, liquid crystal molecules included in the liquid crystal layer of the first and third display regions rotate from initial alignment directions (alignment directions controlled by the first alignment film and the second alignment film) toward directions of electric fields in a counter-clockwise direction in a substrate horizontal plane, and liquid crystal molecules included in the liquid crystal layer of the second and fourth display regions rotate from initial alignment directions (alignment directions controlled by the first alignment film and the second alignment film) toward directions of electric fields in a clockwise direction in a substrate horizontal plane. Therefore, view angle compensation is performed in a plane orthogonal to the first axis and in a plane orthogonal to the second axis, and accordingly, display with wide view angle is attained.

Here, although alignment controlling directions of the alignment films are set so as to parallel to the optical axis of the polarizing plate, the alignment controlling directions could be slightly shifted due to manufacturing errors. For example, when the alignment controlling directions of the alignment films are shifted by $\theta_R$ relative to the optical axis of the polarizing plate in the clockwise direction, the liquid crystal molecules in the first and third display regions rotate across the optical axis of the polarizing plate (for example, a transmission axis) toward the direction of the electric fields. Therefore, when the liquid crystal molecules are aligned parallel to the optical axis of the polarizing plate, dark display is performed resulting in deterioration of brightness. On the other hand, the liquid crystal molecules in the second and fourth display regions do not rotate across the optical axis of the polarizing plate, that is, alignment states of the liquid crystal molecules in the second and fourth display regions are not changed. Accordingly, unlike the first and third display regions, deterioration of brightness is avoided.

In the related art, in a liquid crystal display device only including two display regions which have different directions in which slit electrodes extend, for example, the first and second display regions, in a single sub-pixel region, images in the adjacent two display regions which vertically divide the single sub-pixel region with the first axis interposed therebetween have different levels of brightness. Therefore, in particular, when images of halftones are displayed, unevenness of brightness may be recognized.

On the other hand, since the liquid crystal display device of this embodiment includes the four display regions which have different directions in which the slit electrodes extend relative to the first axis and the second axis, in the display regions vertically adjacent to each other with the first axis AX1 interposed therebetween and in the display regions horizontally adjacent to each other with the second axis AX2 interposed therebetween, the voltage-transmissivity characteristics in the adjacent two display regions are compensated for each other. Accordingly, an image having uniform brightness as a whole is displayed.

Note that the term "an optical axis of a polarizing plate" means a transmission axis or an absorption axis of the polarizing plate. A first polarizing plate is arranged on a surface of one of the substrates on which the first and second electrodes are arranged, the surface being opposite to a surface located near the liquid crystal layer. A second polarizing plate is arranged on a surface of the other of the substrates, the surface being opposite to a surface located near the liquid crystal layer. An optical axis of the first polarizing plate is orthogonal to an optical axis of the second polarizing plate. In a case of an active matrix liquid crystal display device including thin-film transistors, the optical axes of the first and second polarizing plates may be arranged in parallel to a direction in which scanning lines connected to the thin-film transistors extend or a direction in which the data lines connected to the thin-film transistors extend.

The plurality of slit electrodes may be arranged with uniform intervals.

The slit electrodes may be configured by forming opening portions having slit shapes on the second electrodes. Opening portions of the first slit electrodes and the opening portions of the second slit electrodes may be connected to each other. Opening portions of the third slit electrodes and the opening portions of the fourth slit electrodes may be connected to each other.

With this configuration, display is effectively performed also in the vicinity of the first axis.

According to another embodiment of the invention, there is provided an electronic apparatus including the liquid crystal display device described above.

With this configuration, deterioration of display which occur due to a displacement between the optical axes and the polarizing plates and the alignment controlling directions of the alignment films is prevented, and consequently, an electronic apparatus capable of displaying a high-quality image is realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
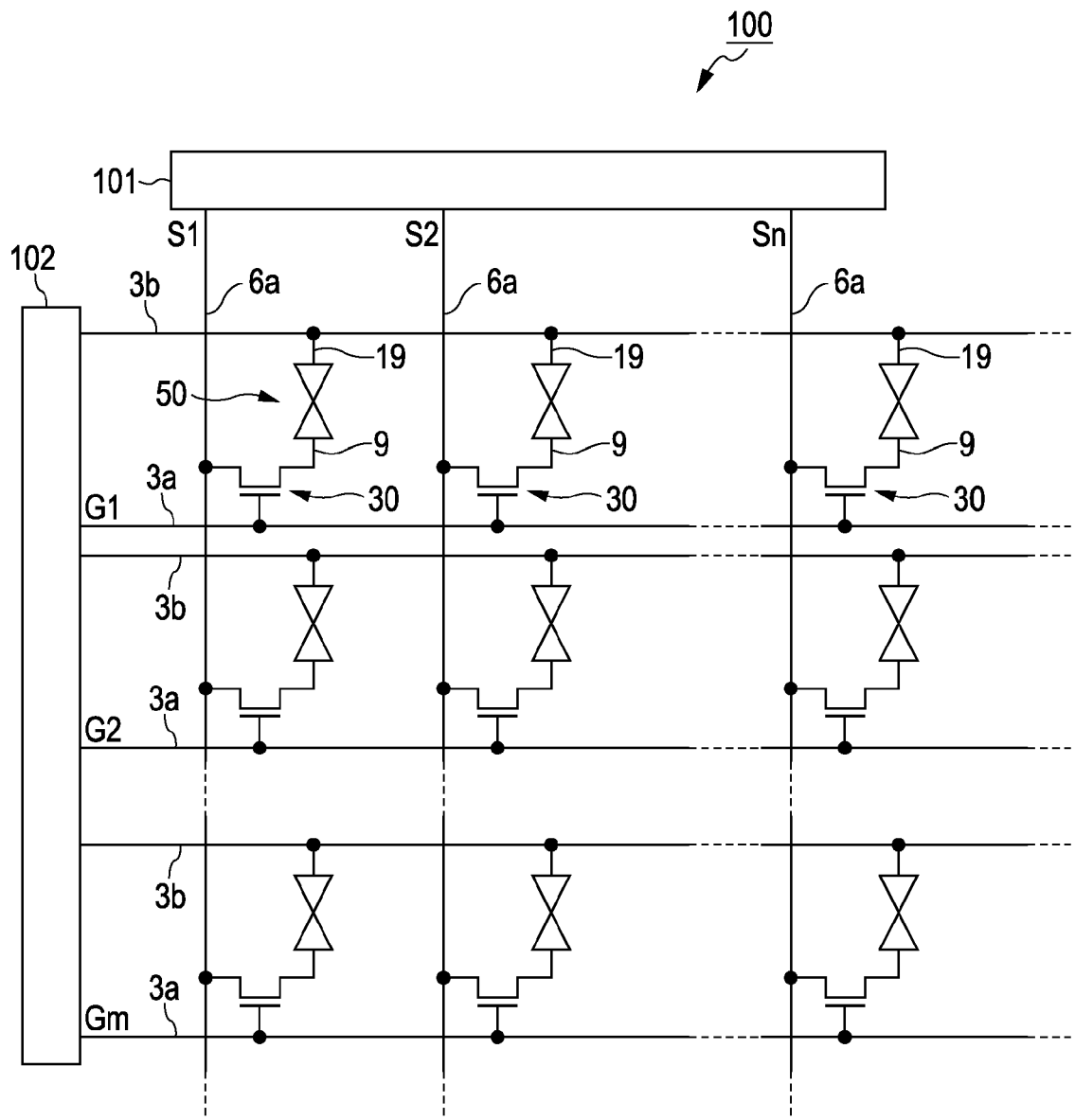
FIG. 1 is a diagram illustrating an equivalent circuit of a liquid crystal display device.

A liquid crystal display device according to an embodiment of the invention will now be described with reference to the accompanying drawings. Note that, in the description below, arrangements of components are described using an XYZ orthogonal coordinate system. In this embodiment, an X direction corresponds to a direction in which scanning lines extend, a Y direction corresponds to a direction in which data lines extend, and a Z direction corresponds to a direction in which a viewer views an image display region. In the drawings, films and components are illustrated by different scales so that the films and the components have sizes recognizable in the drawings.

The liquid crystal display device of this embodiment employs an FFS (Fringe Field Switching) method among various methods for displaying images by controlling alignment of liquid crystal by applying an electric field to the liquid crystal substantially in a direction of a substrate plane. Furthermore, the liquid crystal display device of this embodiment is a color liquid crystal display device, and a single pixel includes three sub-pixels which emit respective R (red) light, G (green) light, and B (blue) light. Hereinafter, a region corresponding to a minimum unit of image display is referred to as a "sub-pixel region", and a region including a set of sub-pixels (R, G, and B) is referred to as a "pixel region". Furthermore, a region including a plurality of pixels arranged in a matrix in the X direction and the Y direction is referred to as an "image display region".

FIG. 1 is a diagram illustrating an equivalent circuit of a liquid crystal display device 100. The liquid crystal display device 100 has an image display region which includes a plurality of sub-pixel regions arranged in a matrix. The sub-pixel regions each include pixel electrodes 9 and TFTs 30 which control the corresponding pixel electrodes 9 by switching, and includes liquid crystal layers 50 interposed between the pixel electrodes 9 and common electrodes 19. The common electrodes 19 are electrically connected to corresponding common lines 3b extending from a scanning line driving circuit 102, and the common electrodes 19 included in the corresponding plurality of sub-pixels have identical potentials.

A plurality of data lines 6a extending from a data line driving circuit 101 are electrically connected to corresponding sources of the TFTs 30. The data line driving circuit 101 supplies image signals S1 to Sn through the data lines 6a to the sub-pixels. The image signals S1 to Sn may be line-sequentially supplied in this order or may be divided into some groups so as to be supplied to the plurality of data lines 6a on a group-by-group basis.

A plurality of scanning lines 3a extending from the scanning line driving circuit 102 are electrically connected to gates of the TFTs 30. The scanning line driving circuit 102 line-sequentially supplies scanning signals G1 to Gm in this order in forms of pulses at predetermined timings through the scanning lines 3a to the gates of the TFTs 30.

The pixel electrodes 9 are electrically connected to corresponding drains of the TFTs 30. When the TFTs 30 serving as switching elements are brought to on states for a predetermined period by inputting the scanning signals G1 to Gm, the image signals S1 to Sn supplied from the data lines 6a are written to the corresponding pixel electrodes 9 at predetermined timings. The image signals S1 to Sn which have predetermined levels and which are written to liquid crystal through the pixel electrodes 9 are held in a space defined by the pixel electrodes 9 and the common electrodes 19 which face the pixel electrodes 9 through the liquid crystal.

Figure 2:
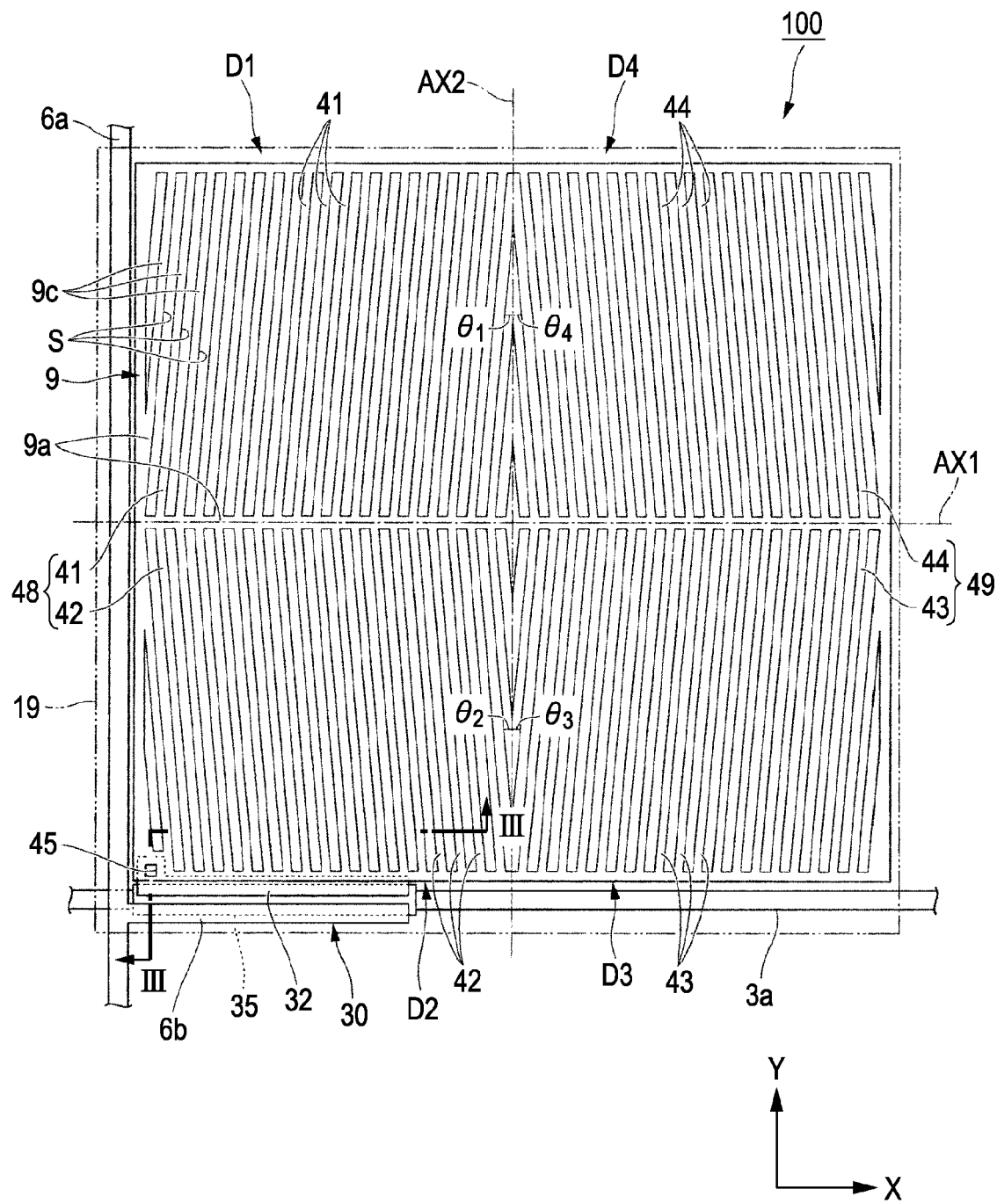
FIG. 2 is a plan view illustrating a sub-pixel included in the liquid crystal display device.

FIG. 2 is a plan view illustrating a configuration of one of the sub-pixel regions included in the liquid crystal display device 100. Hereinafter, description will be made taking one of the sub-pixel regions as an example. The sub-pixel region included in the liquid crystal display device 100 includes the pixel electrode (second electrode) 9 having a plurality of opening portions S which have slit shapes and which extend substantially parallel to the Y direction, and a common electrode (first electrode) 19 which has a substantially rectangular shape and which overlaps with the pixel electrode 9 in a plan view. The pixel electrode 9 includes a plurality of slit electrodes 9c (38 slit electrodes 9c in FIG. 2) arranged in the X direction and a frame portion 9a which has a substantially rectangular frame shape in a plan view and which is connected to end portions of the slit electrodes 9c. Note that, in the single sub-pixel region, a region in which the pixel electrode 9 overlaps with the common electrode 19 in a plan view functions as a capacitor of the sub-pixel region. Therefore, it is not necessary to separately provide a storage capacitor, and a high aperture ratio is attained.

The pixel electrode 9 includes a plurality of regions including corresponding groups of the slit electrodes 9c. Directions in which the groups of the slit electrodes 9c extend are different for individual groups. In this embodiment, the single sub-pixel region is divided into four display regions D1 to D4 by a first axis AX1 which extends in parallel to the X direction and which passes through the center of the pixel electrode 9 and a second axis AX2 which extends in parallel to the Y direction and which passes through the center of the pixel electrode 9. In each of the display regions, the plurality of slit electrodes 9c are arranged in parallel to each other with predetermined intervals in the X direction. The slit electrodes 9c included in one (for example, referred to as a "first display region") of the display regions extend in a direction different from a direction in which the slit electrodes 9c included in one of the other display regions which is adjacent, in the Y direction, to the first display region with the first axis AX1 interposed therebetween extend.

For example, among the four display regions, a display region which is located near a corresponding one of the data lines 6a and away from a corresponding one of the scanning lines 3a is referred to as a first display region D1, a display region which is located adjacent to the first display region D1 with the first axis AX1 interposed therebetween is referred to as a second display region D2, a display region which is located adjacent to the second display region D2 with the second axis AX2 interposed therebetween is referred to as a third display region D3, and a display region which is located adjacent to the third display region D3 with the first axis AX1 interposed therebetween is denoted by a fourth display region D4. Then, the slit electrodes 9c included in the first display region D1 are referred to as first slit electrodes 41, the slit electrodes 9c included in the second display region D2 are referred to as second slit electrodes 42, the slit electrodes 9c included in the third display region D3 are referred to as third slit electrodes 43, and the slit electrodes 9c included in the fourth display region D4 are referred to as fourth slit electrodes 44.

In this embodiment, the first slit electrodes 41 extend in a direction in which an axis extending in the direction makes an acute angle with the second axis AX2 in a clockwise direction. The second slit electrodes 42 extend in a direction in which an axis extending in the direction makes an acute angle with the second axis AX2 in a counterclockwise direction. The third slit electrodes 43 extend in a direction in which an axis extending in the direction makes an acute angle with the second axis AX2 in a clockwise direction. Similarly, the fourth slit electrodes 44 extend in a direction in which an axis extending in the direction makes an acute angle with the second axis AX2 in a counterclockwise direction. Accordingly, each of the first slit electrodes 41 extends so that the farther a portion of the first slit electrode 41 of interest becomes relative to a corresponding one of the data lines 6a, the farther the portion of the first slit electrode 41 of interest becomes relative to a corresponding one of the scanning lines 3a. Each of the second slit electrodes 42 extends so that the farther a portion of the second slit electrodes 42 of interest becomes relative to the corresponding one of the data lines 6a, the closer the portion of the second slit electrodes 42 of interest becomes relative to the corresponding one of the scanning lines 3a. Each of the third slit electrodes 43 extends so that the farther a portion of the third slit electrodes 43 of interest becomes relative to the corresponding one of the data lines 6a, the farther the portion of the third slit electrodes 43 of interest becomes relative to a corresponding one of the scanning lines 3a. Similarly, each of the fourth slit electrodes 44 extends so that the farther a portion of the fourth slit electrodes 44 of interest becomes relative to the corresponding one of the data lines 6a, the closer the portion of the fourth slit electrodes 44 of interest becomes relative to the corresponding one of the scanning lines 3a.

An acute angle defined by the second axis AX2 and one of the first slit electrodes 41 is denoted by an angle $\theta_1$, an acute angle defined by the second axis AX2 and one of the second slit electrodes 42 is denoted by an angle $\theta_2$, an acute angle defined by the second axis AX2 and one of the third slit electrodes 43 is denoted by an angle $\theta_3$, and an acute angle defined by the second axis AX2 and one of the fourth slit electrodes 44 is denoted by an angle $\theta_4$. Each of the angles $\theta_1$, $\theta_2$, $\theta_3$, and $\theta_4$ is within a range from 10° to 15°. The angles $\theta_1$, $\theta_2$, $\theta_3$, and $\theta_4$ may be different angles or may be the same angles. In this case, the angles $\theta_1$, $\theta_2$, $\theta_3$, and $\theta_4$ are the same angles.

The number of the first slit electrodes 41 is equal to the number of the second slit electrodes 42, and the first slit electrodes 41 and the second slit electrodes 42 are arranged so that the first axis AX1 is interposed between a group of the first slit electrodes 41 and a group of the second slit electrodes 42. A ratio (duty ratio) of a width of one of the first slit electrodes 41 to a width of one of slits generated between adjacent first slit electrodes 41 is equal to a ratio (duty ratio) of a width of one of the second slit electrodes 42 to a width of one of slits generated between adjacent second slit electrodes 42. The first slit electrodes 41 and the second slit electrodes 42 are connected to the frame portion 9a arranged on the first axis AX1. The first slit electrodes 41 are arranged so as to correspond to the second slit electrodes 42. The first slit electrodes 41 and the corresponding second slit electrodes 42 are symmetrically arranged with respect to the first axis AX1. The first slit electrodes 41 are connected to the corresponding second slit electrodes 42 on the first axis AX1, and the first slit electrodes 41 and the corresponding second slit electrodes 42 constitute first bent electrodes 48 each of which includes a bent portion on the first axis AX1 and each of which has a substantially V-shape in plan view. The first bent electrodes 48 are arranged in one of half regions of the sub-pixel region, which is obtained by dividing the sub-pixel region into two with respect to the second axis AX2 and which is one of obtained half regions near the corresponding one of the data lines 6a. Each of the first bent electrodes 48 has a shape in which half portions thereof are symmetric with each other with respect to the first axis AX1. The first bent electrodes 48 are arranged in parallel in the X direction with uniform intervals interposed therebetween.

The number of the third slit electrodes 43 is equal to the number of the fourth slit electrodes 44, and the third slit electrodes 43 and the fourth slit electrodes 44 are arranged so that the first axis AX1 is interposed between a group of the third slit electrodes 43 and a group of the fourth slit electrodes 44. A ratio (duty ratio) of a width of one of the third slit electrodes 43 to a width of one of slits generated between adjacent third slit electrodes 43 is equal to a ratio (duty ratio) of a width of one of the fourth slit electrodes 44 to a width of one of slits generated between adjacent fourth slit electrodes 44. The third slit electrodes 43 and the fourth slit electrodes 44 are connected to the frame portion 9a arranged on the first axis AX1. The third slit electrodes 43 are arranged so as to correspond to the fourth slit electrodes 44. The third slit electrodes 43 and the corresponding fourth slit electrodes 44 are symmetrically arranged with respect to the first axis AX1. The third slit electrodes 43 are connected to the corresponding fourth slit electrodes 44 on the first axis AX1, and the third slit electrodes 43 and the corresponding fourth slit electrodes 44 constitute second bent electrodes 49 each of which includes a bent portion on the first axis AX1 which has a substantially V-shape in plan view. The second bent electrodes 49 are arranged in one of half regions of the sub-pixel region, which is obtained by dividing the sub-pixel region into two with respect to the second axis AX2 and which is one of obtained half regions away from the corresponding one of the data lines 6a. Each of the first bent electrodes 48 has a shape in which half portions thereof are symmetric with each other with respect to the first axis AX1. The second bent electrodes 49 are arranged in parallel in the X direction with uniform intervals interposed therebetween.

The number of the first bent electrodes 48 is equal to the number of the second bent electrodes 49, and the first bent electrodes 48 and the second bent electrodes 49 are arranged so that the second axis AX2 is interposed between a group of the first bent electrodes 48 and a group of the second bent electrodes 49. A duty ratio of each of the first bent electrodes 48 is equal to a duty ratio of each of the second bent electrodes 49. The first bent electrodes 48 are arranged so as to correspond to the second bent electrodes 49. The first bent electrodes 48 and the corresponding second bent electrodes 49 are symmetrically arranged with respect to the second axis AX2, except for a pair of one of the first bent electrodes 48 and one of the second bent electrodes 49 which is arranged in an outermost portion of the pixel electrode 9. The first bent electrodes 48 have the substantially V-shapes in a plan view so that the bent portions thereof are positioned closer to the corresponding one of the data lines 6a. The second bent electrodes 49 have the substantially V-shapes in a plan view, which are reversed V-shapes with respect to the shapes of the first bent electrodes 48, so that the bent portions thereof are positioned away from the corresponding one of the data lines 6a. Accordingly, the first bent electrodes 48 and the second bent electrodes 49 are arranged so that the bent portions of the first bent electrodes 48 and the bent portions of the second bent electrodes 49 are positioned away from the second axis AX2.

The sub-pixel region includes one of the data lines 6a extending in the Y direction and one of the scanning lines 3a extending in the X direction. The TFT 30 is arranged in the vicinity of an intersection of the data line 6a of interest and the scanning line 3a of interest. The TFT 30 includes a semiconductor film 35 formed of amorphous silicon which is arranged so as to partially overlap with the scanning line 3a of interest, a source electrode 6b and a drain electrode 32 which are arranged so as to partially overlap with the semiconductor film 35 in a plan view. A portion of the scanning line 3a of interest functions as a gate electrode of the TFT 30 and overlaps with the semiconductor film 35 in a plan view. The source electrode 6b is branched from the data line 6a of interest and extends on the semiconductor film 35. The pixel electrode 9 is arranged on the drain electrode 32, and a pixel contact hole 45 is arranged in a portion in which the pixel electrode 9 overlaps with the drain electrode 32 in a plan view.

The drain electrode 32 and the pixel electrode 9 are electrically connected to each other through the pixel contact hole 45.

Figure 3:
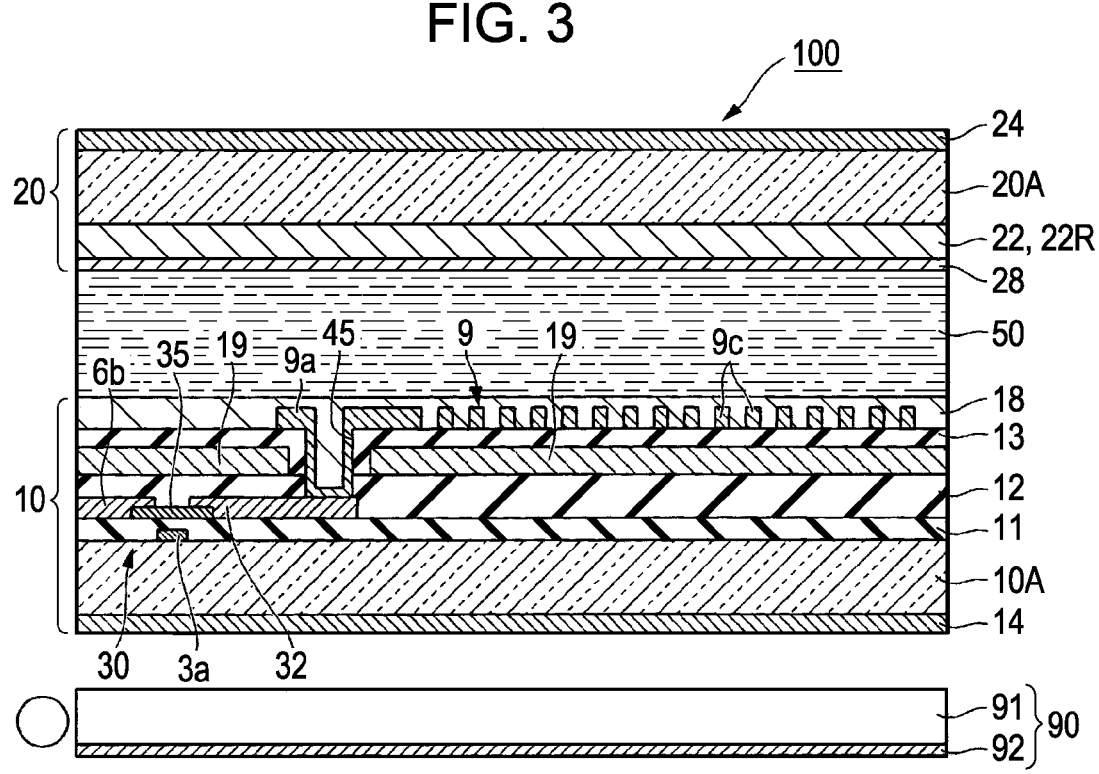
FIG. 3 is a sectional view taken along a line III to III of FIG. 2.

FIG. 3 is a sectional view taken along a line III to III of FIG. 2. The liquid crystal display device 100 includes a TFT array substrate 10, a counter substrate 20 which faces the TFT array substrate 10, a liquid crystal layer 50 sandwiched between the TFT array substrate 10 and the counter substrate 20, a first polarizing plate 14 arranged on an outer surface side (on a side opposite to a side near the liquid crystal layer 50) of the TFT array substrate 10, a second polarizing plate 24 arranged on an outer surface side of the counter substrate 20, a illuminating device 90 arranged outside of the first polarizing plate 14. With this configuration, the liquid crystal display device 100 emits illumination light from the outer surface side of the first polarizing plate 14.

The TFT array substrate 10 includes a translucent substrate body 10A formed of glass, quartz, or plastic, as a base substance. The scanning lines 3a are arranged on an inner surface side of the substrate body 10A (on a side near the liquid crystal layer 50), and furthermore, a gate insulation film 11 which is a transparent insulation film formed of silicon oxide, for example, and which covers the scanning lines 3a is arranged on the inner surface side of the substrate body 10A.

In each of the sub-pixel regions, the semiconductor film 35 formed of amorphous silicon is arranged on the gate insulation film 11, and the source electrode 6b and the drain electrode 32 are arranged so as to partially overlap with the semiconductor film 35. The semiconductor film 35 faces a corresponding one of the scanning lines 3a through the gate insulation film 11, and the portion of the scanning line 3a of interest which overlaps with the semiconductor film 35 serves as the gate electrode of the TFT 30.

A first interlayer insulation film 12 formed of silicon oxide, for example, is arranged on the gate insulation film 11 so as to cover the semiconductor film 35, the source electrode 6b, and the drain electrode 32. The solid common electrode 19 formed of transparent conductive material, such as ITO, is arranged on the first interlayer insulation film 12. A second interlayer insulation film 13 formed of silicon oxide, for example, is arranged on the common electrode 19 so as to cover the common electrode 19. The pixel electrodes 9 formed of transparent conductive material such as ITO is patterned on the second interlayer insulation film 13.

The pixel contact hole 45 is formed so as to penetrate through the first interlayer insulation film 12 and the second interlayer insulation film 13 and reaches the drain electrode 32. A portion of the pixel electrode 9 is buried into the pixel contact hole 45 whereby the pixel electrodes 9 are electrically connected to the drain electrode 32. The common electrode 19 is provided with an opening portion which corresponds to a portion in which the pixel contact hole 45 is formed. By this, the common electrode 19 is not in contact with the pixel electrode 9.

A first alignment film 18 formed of a polyimide, for example, is arranged on the second interlayer insulation film 13 so as to cover the pixel electrodes 9. The first alignment film 18 is subjected to alignment processing such as rubbing processing so that liquid crystal molecules are aligned in a predetermined direction. An alignment controlling direction of the first alignment film 18 is parallel to a direction in which the data lines 6a extend.

The counter substrate 20 includes a translucent substrate body 20A formed of glass, quartz, or plastic, as a base substance. A color filter film 22 is arranged on an inner surface side of the substrate body 20A (on a side near the liquid crystal layer 50). The color filter film 22 formed of acrylic is arranged for each sub-pixel region, and contains color material corresponding to display color of corresponding one of the sub-pixel regions.

A second alignment film 28 formed of polyimide, for example, is arranged on an inner surface side of the color filter film 22. The second alignment film 28 has a configuration the same as that of the first alignment film 18, and an alignment controlling direction of the second alignment film 28 is anti-parallel to that of the first alignment film 18. Accordingly, the liquid crystal layer 50 arranged between the TFT array substrate 10 and the counter substrate 20 has a horizontal alignment state as an initial alignment state.

Figure 4:
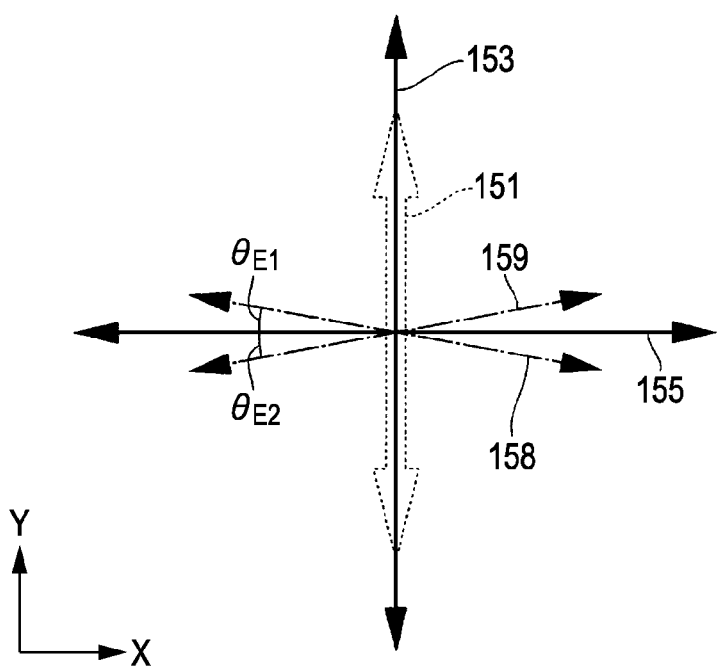
FIG. 4 is a diagram illustrating the arrangement relationship among optical axes of the liquid crystal display device.

FIG. 4 is a diagram illustrating the arrangement relationship among optical axes of optical elements, for example, included in the liquid crystal display device 100. A transmission axis 155 of the first polarizing plate 14 is parallel to the X direction. A transmission axis 153 of the second polarizing plate 24 is parallel to the Y direction. The first alignment film 18 and the second alignment film 28 are subjected to rubbing processing in an identical direction in a plan view, and the direction corresponds to a rubbing direction 151. Although the rubbing direction 151 (alignment controlling direction) is set in parallel to the Y axis, the rubbing direction 151 could be displaced within a range from 0° to 5° due to a manufacturing error.

A direction of a lateral electric field generated between the pixel electrodes 9 and the common electrode 19 is orthogonal to a direction in which the slit electrodes 9c arranged on the pixel electrodes 9 extend. A direction in which the first slit electrodes 41 extend is parallel to a direction in which the third slit electrodes 43 extend, and an axis of the directions and the Y axis make an angle in a range from 10° to 15° in a clockwise direction with respect to the Y axis. Therefore, the direction of a lateral electric field generated between the first slit electrodes 41 and the common electrode 19 and a direction 158 of a lateral electric field generated between the third slit electrodes 43 and the common electrode 19 correspond to a direction of an axis which makes an angle in a range from 10° to 15° (denoted by $\theta_{E1}$ in FIG. 4) in a clockwise direction with respect to the X axis. On the other hand, a direction in which the second slit electrodes 42 extend is parallel to a direction in which the fourth slit electrodes 44 extend, and an axis of the directions and the Y axis make an angle in a range from 10° to 15° in a counterclockwise direction with respect to the Y axis. Therefore, the direction of a lateral electric field generated between the second slit electrodes 42 and the common electrode 19 and a direction 159 of a lateral electric field generated between the fourth slit electrodes 44 and the common electrode 19 correspond to a direction of an axis which makes an angle in a range from 10° to 15° (denoted by $\theta_{E2}$ in FIG. 4) in a counterclockwise direction with respect to the X axis.

In each of the sub-pixel regions in the liquid crystal display device 100, since an image signal (voltage) is supplied to the pixel electrodes 9 through the TFT 30, an electric field in a direction of a substrate surface is generated between the pixel electrodes 9 and the common electrode 19, and the liquid crystal is driven by the electric field. Then, display is performed by changing transmissivity for each sub-pixel region. That is, in a state in which voltage is not applied to the pixel electrodes 9, the liquid crystal molecules included in the liquid crystal layer 50 are horizontally aligned in parallel to the rubbing direction. When an electric field is generated in the liquid crystal layer 50 through the pixel electrodes 9 and the common electrode 19 along a direction orthogonal to the direction in which the slit electrodes 9c included in the pixel electrodes 9 extend, the liquid crystal molecules are rotated in the substrate surface and aligned in a direction in parallel to the direction of the generated electric field.

The illumination light emitted from the illuminating device 90 passes through the first polarizing plate 14 to thereby be converted into linear polarized light which is emitted along the transmission axis 155 of the first polarizing plate 14 and is incident on the liquid crystal layer 50. When the liquid crystal layer 50 is in an off state (in a non-selection state), the linear polarized light incident on the liquid crystal layer 50 is emitted from the liquid crystal layer 50 in a state the same as the state of the light obtained when the light is incident on the liquid crystal layer 50. The linear polarized light is absorbed in the second polarizing plate 24 having the transmission axis 153 orthogonal to the linear polarized light whereby the sub-pixel region is displayed as dark display. On the other hand, when the liquid crystal layer 50 is in an on state (in a selection state), the liquid crystal layer 50 adds a predetermined phase difference (½ wavelength) to the linear polarized light incident on the liquid crystal layer 50 so that the linear polarized light is converted into linear polarized light which is rotated by 90° with respect to a direction of the polarized light obtained when the polarized light is incident on the liquid crystal layer 50. Then, the converted polarized light is emitted from the liquid crystal layer 50. Since the linear polarized light is emitted parallel to the transmission axis 153 of the second polarizing plate 24, the linear polarized light is transmitted through the second polarizing plate 24 and is recognized as display light whereby the sub-pixel region is displayed as bright display. As described above, a liquid crystal display device in a normally black mode is realized.

As shown in FIG. 2, the single sub-pixel region includes the four types of slit electrodes, i.e., the first slit electrodes 41, the second slit electrodes 42, the third slit electrodes 43, and the fourth slit electrodes 44. That is, the single sub-pixel region includes four types of display regions, i.e., the first display region D1, the second display region D2, the third display region D3, and the fourth display region D4 which have respective alignment states of molecules different depending on directions in which the first slit electrodes 41, the second slit electrodes 42, the third slit electrodes 43, and the fourth slit electrodes 44 extend (that is, depending on directions in which the lateral electric fields are generated). Rotation directions of the liquid crystal molecules included in the display regions D1, D2, D3, and D4 are individually determined for each display region to be a clockwise direction or a counter-clockwise direction in accordance with the directions in which the slit electrodes 41, 42, 43, and 44 extend and the rubbing directions of the alignment films 18 and 28. The four types of slit electrodes, i.e., the first slit electrodes 41, the second slit electrodes 42, the third slit electrodes 43, and the fourth slit electrodes 44 are arranged symmetrically with respect to the first axis AX1 and the second axis AX2. Therefore, view-angle compensation is performed in two directions, i.e., in a direction orthogonal to the first axis AX1 and in a direction orthogonal to the second axis AX2. Accordingly, display with wide view-angle is attained.

Figure 5:
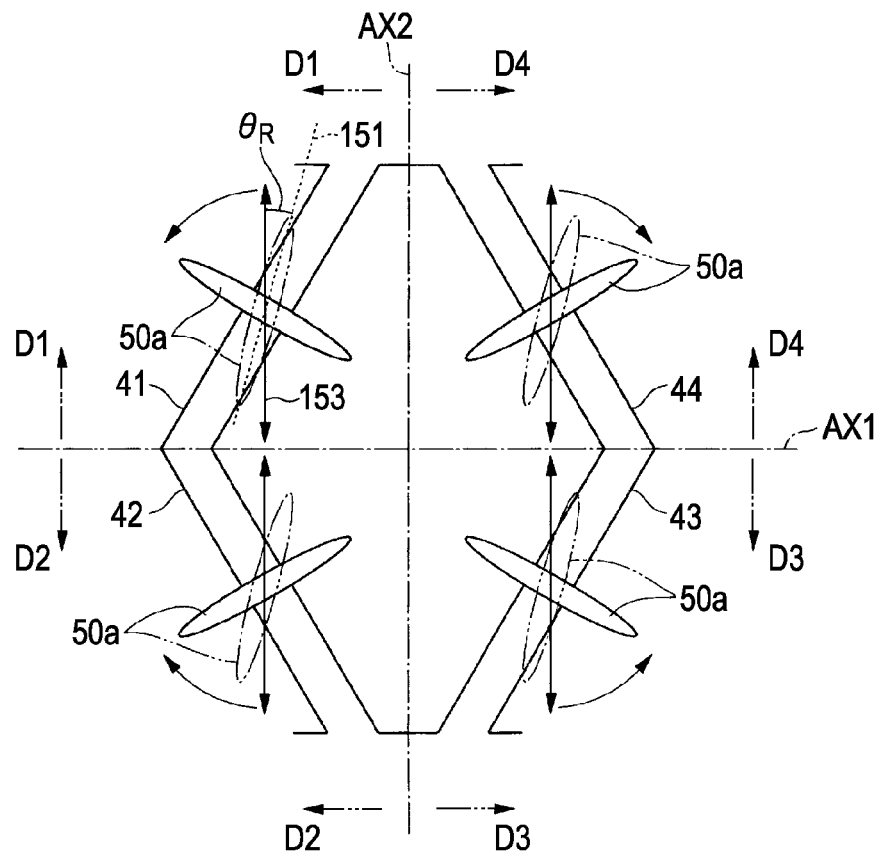
FIG. 5 is a plan view schematically illustrating an alignment state of liquid crystal molecules in various display regions included in the liquid crystal display device.

FIG. 5 is a plan view schematically illustrating alignment states of liquid crystal molecules 50a included in the display regions D1 to D4. Directions of electric fields generated in the first display region D1 and the third display region D3 (that is, directions orthogonal to directions in which the first slit electrodes 41 and the third slit electrodes 43 extend) make acute angles with the rubbing direction 151 in a counterclockwise direction with respect to the rubbing direction 151. Therefore, the liquid crystal molecules 50a included in the first display region D1 and the third display region D3 are rotated from the rubbing direction 151 toward the directions of the electric fields in the counterclockwise direction in a substrate horizontal plane. On the other hand, directions of electric fields generated in the second display region D2 and the fourth display region D4 make acute angles with the rubbing direction 151 in a clockwise direction with respect to the rubbing direction 151. Therefore, the liquid crystal molecules 50a included in the second display region D2 and the fourth display region D4 are rotated from the rubbing direction 151 toward the directions of the electric fields in the clockwise direction in the substrate horizontal plane.

Here, although the rubbing direction 151 of the first alignment film 18 and the second alignment film 28 are set so as to parallel to the transmission axis 153 of the second polarizing plate 24, the rubbing direction 151 could be slightly displaced from the direction parallel to the transmission axis 153 due to a manufacturing error. For example, when the rubbing direction 151 is tilted by an angle $\theta_R$ with respect to the transmission axis 153 in the clockwise direction, the liquid crystal molecules 50a included in the first display region D1 and the third display region D3 are rotated in the directions of the electric fields across the transmission axis 153 of the second polarizing plate 24. Therefore, when the liquid crystal molecules 50a are aligned in parallel to the transmission axis 153 of the second polarizing plate 24, dark display is performed, resulting in deterioration of brightness. On the other hand, since the alignment states of the liquid crystal molecules 50a included in the second display region D2 and the fourth display region D4 are not changed, that is, the liquid crystal molecules 50a included in the second display region D2 and the fourth display region D4 are not rotated across the transmission axis 153 of the second polarizing plate 24, unlike the first display region D1 and the third display region D3, deterioration of brightness does not occur.

Note that FIG. 5 shows a case where an intersection angle $\theta_5$ made by an axis of the rubbing direction of the first alignment film 18 and the transmission axis 153 of the second polarizing plate 24 is equal to an intersection angle $\theta_6$ made by the rubbing direction of the second alignment film 28 and the transmission axis 153 of the second polarizing plate 24 (that is, the angles $\theta_5$ and $\theta_6$ make acute angles $\theta_R$ with the transmission axis 153 of the second polarizing plate 24 in the clockwise direction with respect to the transmission axis 153). However, even when the angles $\theta_5$ and $\theta_6$ are different from each other, if the angles $\theta_5$ and $\theta_6$ are smaller than any of angles $\theta_1$ to $\theta_4$, the same effect is obtained.

Figure 6:
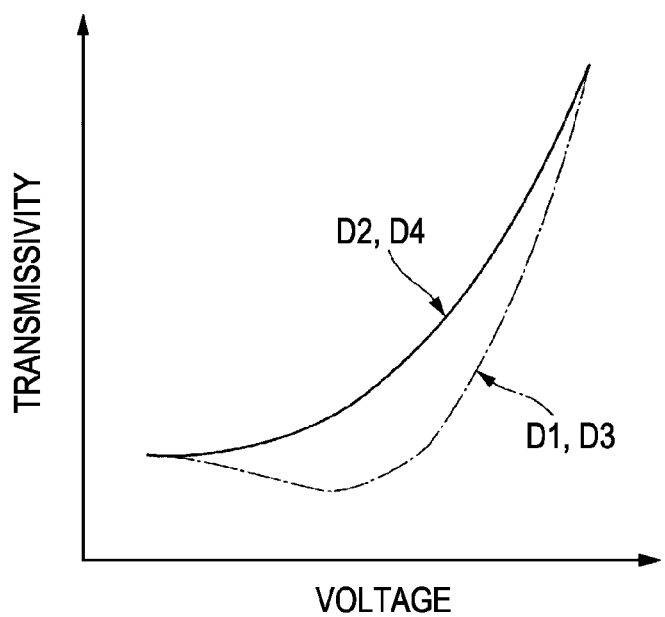
FIG. 6 is a diagram illustrating the relationships between a voltage and transmissivity of the various display regions of the liquid crystal display device.

FIG. 6 is a diagram illustrating voltage-transmissivity characteristics of the display regions D1 to D4. In the first display region D1 and the third display region D3, as the voltage increases to a certain amount, the transmissivity is lowered, and thereafter, as the voltage further increases, the transmissivity increases. On the other hand, in the second display region D2 and the fourth display region D4, as the voltage increases, the transmissivity increases. This is because the alignments of the liquid crystal molecules change across the transmission axis of the second polarizing plate 24 in the first and third display regions D1 and D3 whereas the alignments of the liquid crystal molecules do not change in such a way in the second and fourth display regions D2 and D4. These two voltage-transmissivity characteristics are changed in accordance with the intersection angle $\theta_R$ (a degree of displacement) made by the rubbing direction 151 and the transmission axis 153 of the second polarizing plate 24. As the intersection angle $\theta_R$ becomes large, a difference between the two voltage-transmissivity characteristics becomes large.

In the related art, in a liquid crystal display device only including two display regions which have different directions in which slit electrodes extend, for example, the first and second display regions D1 and D2, in a single sub-pixel region, images in the adjacent two display regions which vertically divide the single sub-pixel region with a second axis AX2 interposed therebetween have different levels of brightness. Therefore, in particular, when images of halftones are displayed, unevenness of brightness may be recognized.

On the other hand, since the liquid crystal display device 100 of this embodiment includes the four display regions D1 to D4 which have different directions in which the slit electrodes extend relative to the first axis AX1 and the second axis AX2, in the display regions vertically adjacent to each other with the first axis AX1 interposed therebetween and in the display regions horizontally adjacent to each other with the second axis AX2 interposed therebetween, the voltage-transmissivity characteristics in the adjacent two display regions are compensated for each other. Accordingly, an image having uniform brightness in the vertical direction and the horizontal direction is displayed as a whole.

That is, uneven brightness could occur between the first and second display regions D1 and D2 due to the difference between the voltage-transmissivity characteristics. However, since the fourth display region D4, which has the voltage-transmissivity characteristic the same as that of the second display region D2, is arranged on the right side of the first display region D1 and the third display region D3, which has the voltage-transmissivity characteristic the same as that of the first display region D1, is arranged on the right side of the second display region D2, the voltage-transmissivity characteristics of the first and second display regions D1 and D2 are compensated for the voltage-transmissivity characteristics of the forth and third display regions D4 and D3 which are arranged adjacent to the first and second display regions D1 and D2, respectively, with the second axis AX2 interposed therebetween.

Furthermore, uneven brightness could occur between the first and fourth display regions D1 and D4 due to the difference between the voltage-transmissivity characteristics. However, since the second display region D2, which has the voltage-transmissivity characteristic the same as that of the fourth display region D4, is arranged on a lower side of the first display region D1 and the third display region D3, which has the voltage-transmissivity characteristic the same as that of the first display region D1, is arranged on a lower side of the fourth display region D4, the voltage-transmissivity characteristics of the first and fourth display regions D1 and D4 are compensated for the voltage-transmissivity characteristics of the second and third display regions D2 and D3 which are arranged adjacent to the first and second display regions D1 and D2, respectively, with the first axis AX1 interposed therebetween. Consequently, an image having less unevenness of brightness in the vertical direction and the horizontal direction is displayed.

In this embodiment, the pixel electrodes 9 are arranged on the common electrode 19 through the insulation film. However, the common electrode 19 may be arranged on the pixel electrodes 9 through the insulation film, and furthermore, the slit electrodes 9c may be arranged on the common electrode 19. In this case also, an effect the same as that described above is attained by making the directions in which the slit electrodes extend in the display regions adjacent to each other with the first axis AX1 interposed therebetween different from each other and by making the directions in which the slit electrodes extend in the display regions adjacent to each other with the second axis AX2 interposed therebetween different from each other.

In this embodiment, the bent portions of the first bent electrodes 48 and the bent portions of the second bent electrodes 49 are arranged so as to be away from the second axis AX2, and both end portions of the first bent electrodes 48 face both end portions of the second bent electrodes 49 with the second axis AX2 interposed therebetween. However, the bent portions of the first bent electrodes 48 and the bent portions of the second bent electrodes 49 may be arranged so as to be close to the second axis AX2 and the both end portions of the first bent electrodes 48 and the both end portions of the second bent electrodes 49 may be arranged so as to be away from the second axis AX2.

In this embodiment, the transmission axis 155 of the first polarizing plate 14 is arranged in the X direction, and the transmission axis 153 of the second polarizing plate 24 is arranged in the Y direction. However, the transmission axis 155 of the first polarizing plate 14 may be arranged in the Y direction, and the transmission axis 153 of the second polarizing plate 24 may be arranged in the X direction. In this case, an absorption axis of the first polarizing plate 14 is arranged in the X direction, and an absorption axis of the second polarizing plate 24 is arranged in the Y direction.

Modifications

FIGS. 7A to 7E are plan views illustrating modifications of a pixel electrode. In FIGS. 7A to 7E, components the same as those shown in FIG. 2 are denoted by reference numerals the same as those shown in FIG. 2, and therefore, detailed descriptions thereof are omitted. In FIGS. 7A to 7E, the number of slit electrodes is different from that of FIG. 2 for simplicity of the drawing.

Figure 7A:
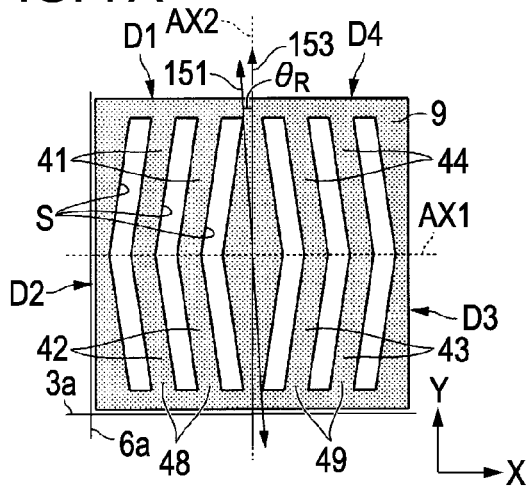
FIGS. 7A to 7E are plan views illustrating modifications of a pixel electrode.

FIG. 7A is a plan view illustrating a first modification of one of the pixel electrodes 9. In the liquid crystal display device 100 in FIG. 2, the opening portions S of the pixel electrode 9 are divided by the frame portion 9a on the first axis AX1. However, in the first modification, the pixel electrode 9 does not include a frame portion on a first axis AX1. Therefore, opening portions S of the pixel electrode 9 included in first and second display regions D1 and D2 are not divided by the frame portion and are formed across the first and second display regions D1 and D2. Similarly, opening portions S of the pixel electrode 9 included in third and fourth display regions D3 and D4 are not divided by the frame portion and are formed across the third and fourth display regions D3 and D4. Other configurations are the same as those of the liquid crystal display device 100 shown in FIG. 2.

Figure 7D:
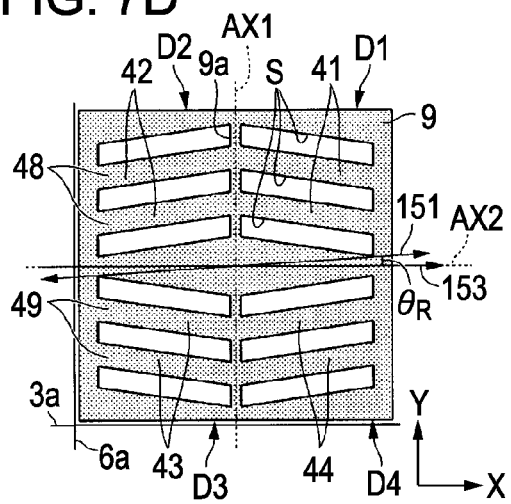
Figure 7B:
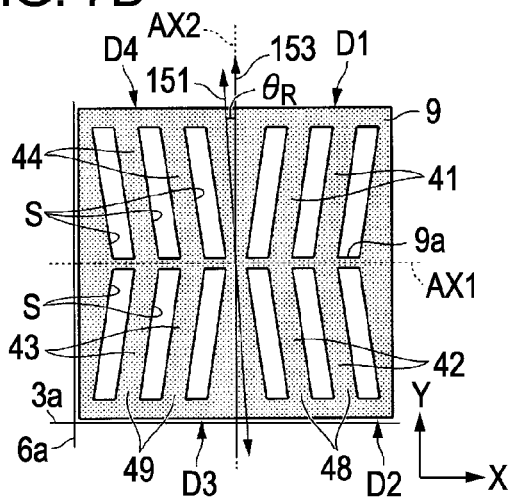

FIG. 7B is a plan view illustrating a second modification of one of the pixel electrodes 9. In the liquid crystal display device 100 in FIG. 2, the bent portions of the first bent electrodes 48 and the bent portions of the second bent electrodes 49 are arranged away from the second axis AX2. However, in a liquid crystal display device of the second modification, bent portions of first bent electrodes 48 and bent portions of second bent electrodes 49 are arranged so as to be close to a second axis AX2.

In the liquid crystal display device of this modification, in each of the pixel electrodes 9, a display region which is located away from a corresponding one of data lines 6a and which is located away from a corresponding one of scanning lines 3a is referred to as a first display region D1, a display region which is located adjacent to the first display region D1 with a first axis AX1 interposed therebetween is referred to as a second display region D2, a display region which is located adjacent to the second display region D2 with the second axis AX2 interposed therebetween is referred to as a third display region D3, and a display region which is located adjacent to the third display region D3 with the first axis AX1 interposed therebetween is referred to as a fourth display region D4. Slit electrodes 9c included in the first display region D1 are referred to as first slit electrodes 41, slit electrodes 9c included in the second display region D2 are referred to as second slit electrodes 42, slit electrodes 9c included in the third display region D3 are referred to as third slit electrodes 43, and slit electrodes 9c included in the fourth display region D4 are referred to as fourth slit electrodes 44.

An axis of a direction in which the first slit electrodes 41 extend makes an acute angle with the second axis AX2 in a clockwise direction with respect to the second axis AX2, an axis of a direction in which the second slit electrodes 42 extend makes an acute angle with the second axis AX2 in a counterclockwise direction with respect to the second axis AX2, an axis of a direction in which the third slit electrodes 43 extend makes an acute angle with the second axis AX2 in the clockwise direction with respect to the second axis AX2, and an axis of a direction in which the fourth slit electrodes 44 extend makes an acute angle with the second axis AX2 in the counterclockwise direction with respect to the second axis AX2. Therefore, each of the first slit electrodes 41 extends so that the farther a portion of the first slit electrode 41 of interest becomes relative to a corresponding one of the data lines 6a, the farther the portion of the first slit electrode 41 of interest becomes relative to a corresponding one of the scanning lines 3a. Each of the second slit electrodes 42 extends so that the farther a portion of the second slit electrodes 42 of interest becomes relative to the corresponding one of the data lines 6a, the closer the portion of the second slit electrodes 42 of interest becomes relative to the corresponding one of the scanning lines 3a. Each of the third slit electrodes 43 extends so that the farther a portion of the third slit electrodes 43 of interest becomes relative to the corresponding one of the data lines 6a, the farther the portion of the third slit electrodes 43 of interest becomes relative to a corresponding one of the scanning lines 3a. Similarly, each of the fourth slit electrodes 44 extends so that the farther a portion of the fourth slit electrodes 44 of interest becomes relative to the corresponding one of the data lines 6a, the closer the portion of the fourth slit electrodes 44 of interest becomes relative to the corresponding one of the scanning lines 3a. Other configurations are the same as those of the liquid crystal display device 100 shown in FIG. 2.

Figure 7E:
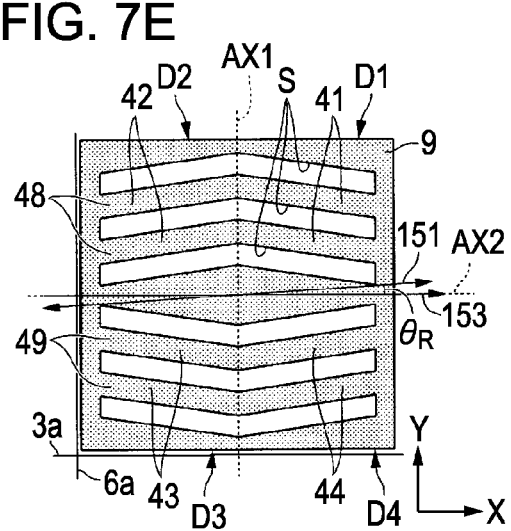
Figure 7C:
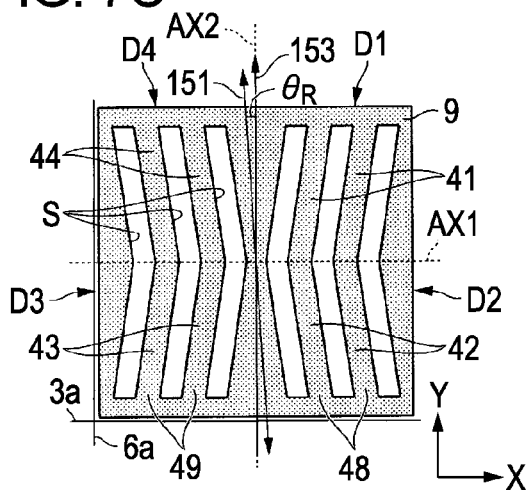

FIG. 7C is a plan view illustrating a third modification of one of the pixel electrodes 9. In the liquid crystal display device of FIG. 7B, the opening portions S of the pixel electrode 9 are divided by a frame portion 9a on the first axis AX1. However, in the third modification, the pixel electrode 9 does not include a frame portion on a first axis AX1. Therefore, opening portions S of the pixel electrode 9 included in first and second display regions D1 and D2 are not divided by the frame portion and are formed across the first and second display regions D1 and D2. Similarly, opening portions S of the pixel electrode 9 included in third and fourth display regions D3 and D4 are not divided by the frame portion and are formed across the third and fourth display regions D3 and D4. Other configurations are the same as those of the liquid crystal display device of in FIG. 7B.

FIG. 7D is a plan view illustrating a forth modification of one of the pixel electrode 9. In the liquid crystal display device 100 shown in FIG. 2, the transmission axis 153 of the second polarizing plate 24 and the rubbing direction 151 are set in parallel to the Y direction and the slit electrodes 41, 42, 43, and 44 are arranged so as to make acute angles with the second axis AX2 which is parallel to the Y direction. On the other hand, in a liquid crystal display device of this modification, a transmission axis 153 of a second polarizing plate 24 and a rubbing direction 151 are set in parallel to the X direction and slit electrodes 41, 42, 43, and 44 are arranged so as to make acute angles with a second axis AX2 which is parallel to the Y direction. In FIG. 7D, an angle $\theta_R$ denotes a displacement of the rubbing direction 151 relative to a direction which is parallel to the transmission axis 153, the displacement being generated due to a manufacturing error. The rubbing direction 151 is preferably parallel to a transmission axis of the transmission axis 153.

In this modification, a single sub-pixel region is divided into four display regions D1 to D4 by the first axis AX1 which passes through the center of the pixel electrode 9 and which is parallel to the Y direction and the second axis AX2 which passes through the center of the pixel electrode 9 and which is parallel to the X direction. In each of the display regions, a plurality of slit electrodes 9c are arranged in parallel in the Y direction with uniform intervals interposed therebetween. Directions in which groups of the slit electrodes 9c extend in the display regions adjacent to each other in the Y direction with the second axis AX2 interposed therebetween are different from each other, and similarly, directions in which groups of the slit electrodes 9c extend in the display regions adjacent to each other in the X direction with the first axis AX1 interposed therebetween are different from each other.

In the liquid crystal display device of this modification, in each of the pixel electrodes 9, among the four display regions, a display region which is located away from a corresponding one of data lines 6a and which is located away from a corresponding one of scanning lines 3a is referred to as a first display region D1, a display region which is located adjacent to the first display region D1 with a first axis AX1 interposed therebetween is referred to as a second display region D2, a display region which is located adjacent to the second display region D2 with the second axis AX2 interposed therebetween is referred to as a third display region D3, and a display region which is located adjacent to the third display region D3 with the first axis AX1 interposed therebetween is referred to as a fourth display region D4. Slit electrodes 9c included in the first display region D1 are referred to as first slit electrodes 41, slit electrodes 9c included in the second display region D2 are referred to as second slit electrodes 42, slit electrodes 9c included in the third display region D3 are referred to as third slit electrodes 43, and slit electrodes 9c included in the fourth display region D4 are referred to as fourth slit electrodes 44.

An axis of a direction in which the first slit electrodes 41 extend makes an acute angle with the second axis AX2 in a clockwise direction with respect to the second axis AX2, an axis of a direction in which the second slit electrodes 42 extend makes an acute angle with the second axis AX2 in a counterclockwise direction with respect to the second axis AX2, an axis of a direction in which the third slit electrodes 43 extend makes an acute angle with the second axis AX2 in the clockwise direction with respect to the second axis AX2, and an axis of a direction in which the fourth slit electrodes 44 extend makes an acute angle with the second axis AX2 in the counterclockwise direction with respect to the second axis AX2. Therefore, each of the first slit electrodes 41 extends so that the farther a portion of the first slit electrode 41 of interest becomes relative to a corresponding one of the data lines 6a, the closer the portion of the first slit electrode 41 of interest becomes relative to a corresponding one of the scanning lines 3a. Each of the second slit electrodes 42 extends so that the farther a portion of the second slit electrodes 42 of interest becomes relative to the corresponding one of the data lines 6a, the farther the portion of the second slit electrodes 42 of interest becomes relative to the corresponding one of the scanning lines 3a. Each of the third slit electrodes 43 extends so that the farther a portion of the third slit electrodes 43 of interest becomes relative to the corresponding one of the data lines 6a, the closer the portion of the third slit electrodes 43 of interest becomes relative to a corresponding one of the scanning lines 3a. Similarly, each of the fourth slit electrodes 44 extends so that the farther a portion of the fourth slit electrodes 44 of interest becomes relative to the corresponding one of the data lines 6a, the farther the portion of the fourth slit electrodes 44 of interest becomes to the corresponding one of the scanning lines 3a.

The number of the first slit electrodes 41 is equal to the number of the second slit electrodes 42, and the first axis AX1 is interposed between a group of the first slit electrodes 41 and a group of the second slit electrodes 42. The first slit electrodes 41 and the second slit electrodes 42 are connected to the frame portion 9a arranged on the first axis AX1. The first slit electrodes 41 are arranged so as to correspond to the second slit electrodes 42, and the first slit electrodes 41 and the corresponding second slit electrodes 42 are symmetrically arranged with respect to the first axis AX1. The first slit electrodes 41 are connected to the corresponding second slit electrodes 42 on the first axis AX1, and the first slit electrodes 41 and the corresponding second slit electrodes 42 constitute first bent electrodes 48 each of which includes a bent portion on the first axis AX1 and each of which has a substantially V-shape in plan view. The first bent electrodes 48 are arranged in one of half regions of a single sub-pixel region, which is obtained by dividing the sub-pixel region into two with respect to the second axis AX2 and which is one of obtained half regions away from the corresponding one of the scanning lines 3a. Each of the first bent electrodes 48 has a shape in which half portions thereof are symmetric with each other with respect to the first axis AX1. The first bent electrodes 48 are arranged in parallel in the Y direction with uniform intervals interposed therebetween.

The number of the third slit electrodes 43 is equal to the number of the fourth slit electrodes 44, and the third slit electrodes 43 and the fourth slit electrodes 44 are arranged so that the first axis AX1 is interposed between a group of the third slit electrodes 43 and a group of the fourth slit electrodes 44. The third slit electrodes 43 and the fourth slit electrodes 44 are connected to the frame portion 9a arranged on the first axis AX1. The third slit electrodes 43 and the corresponding fourth slit electrodes 44 are symmetrically arranged with respect to the first axis AX1. The third slit electrodes 43 are connected to the corresponding fourth slit electrodes 44 on the first axis AX1, and the third slit electrodes 43 and the corresponding fourth slit electrodes 44 constitute second bent electrodes 49 each of which includes a bent portion on the first axis AX1 and each of which has a substantially V-shape in plan view. The second bent electrodes 49 are arranged in one of half regions of the sub-pixel region, which is obtained by dividing the sub-pixel region into two with respect to the second axis AX2 and which is one of obtained half regions near the corresponding one of the scanning lines 3a. Each of the first bent electrodes 48 has a shape in which half portions thereof are symmetric with each other with respect to the first axis AX1. The second bent electrodes 49 are arranged in parallel in the Y direction with uniform intervals interposed therebetween.

The number of the first bent electrodes 48 is equal to the number of the second bent electrodes 49, and the first bent electrodes 48 and the second bent electrodes 49 are arranged so that the second axis AX2 is interposed between a group of the first bent electrodes 48 and a group of the second bent electrodes 49. The first bent electrodes 48 are arranged so as to correspond to the second bent electrodes 49. The first bent electrodes 48 and the corresponding second bent electrodes 49 are symmetrically arranged with respect to the second axis AX2, except for a pair of one of the first bent electrodes 48 and one of the second bent electrodes 49 which is arranged in an outermost portion of the pixel electrode 9. The first bent electrodes 48 have the substantially V-shapes in a plan view so that the bent portions thereof are positioned away from the corresponding one of the scanning lines 3a. The second bent electrodes 49 have the substantially V-shapes in a plan view, which are reversed V-shapes with respect to the shapes of the first bent electrodes 48, so that the bent portions thereof are positioned closer to the corresponding one of the scanning lines 3a. Accordingly, the first bent electrodes 48 and the second bent electrodes 49 are arranged so that the bent portions of the first bent electrodes 48 and the bent portions of the second bent electrodes 49 are positioned away from the second axis AX2.

FIG. 7E is a plan view illustrating a fifth modification of one of the pixel electrodes 9. In the liquid crystal display device in FIG. 7D, the opening portions S of the pixel electrode 9 are divided by the frame portion 9a on the first axis AX1. However, in the fifth modification, the pixel electrode 9 does not include a frame portion on a first axis AX1. Therefore, opening portions S of the pixel electrode 9 included in first and second display regions D1 and D2 are not divided by the frame portion and are formed across the first and second display regions D1 and D2. Similarly, opening portions S of the pixel electrode 9 included in third and fourth display regions D3 and D4 are not divided by the frame portion and are formed across the third and fourth display regions D3 and D4. Other configurations are the same as those of the liquid crystal display device shown in FIG. 7D.

Electronic Apparatuses

Figure 8:
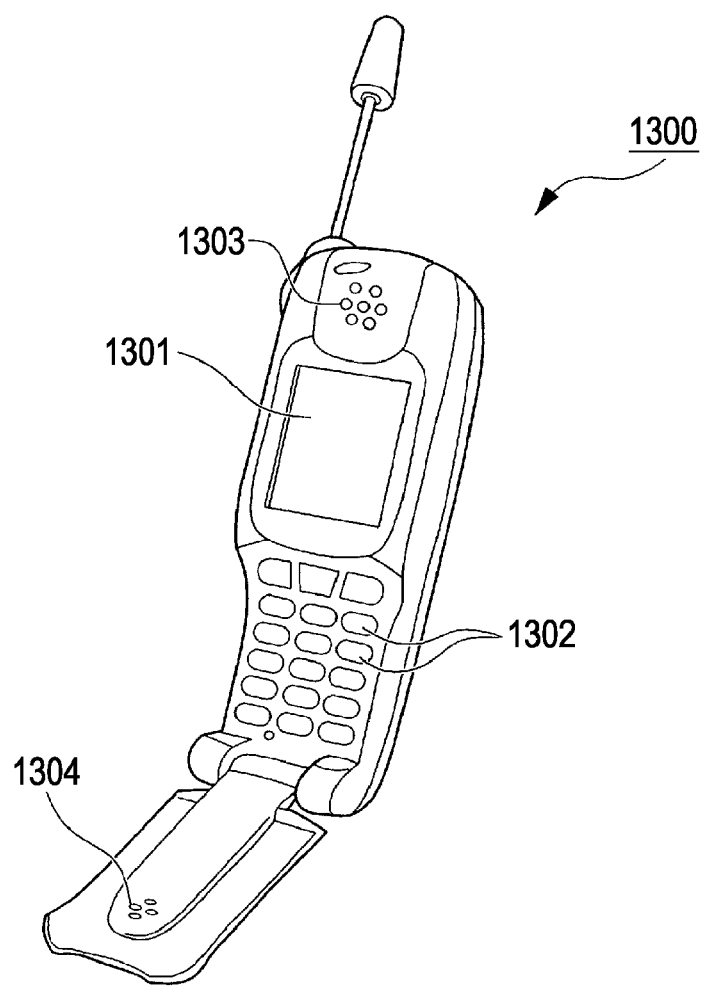
FIG. 8 is a perspective view illustrating a cellular phone which is an example of an electronic apparatus.
Figure 9:
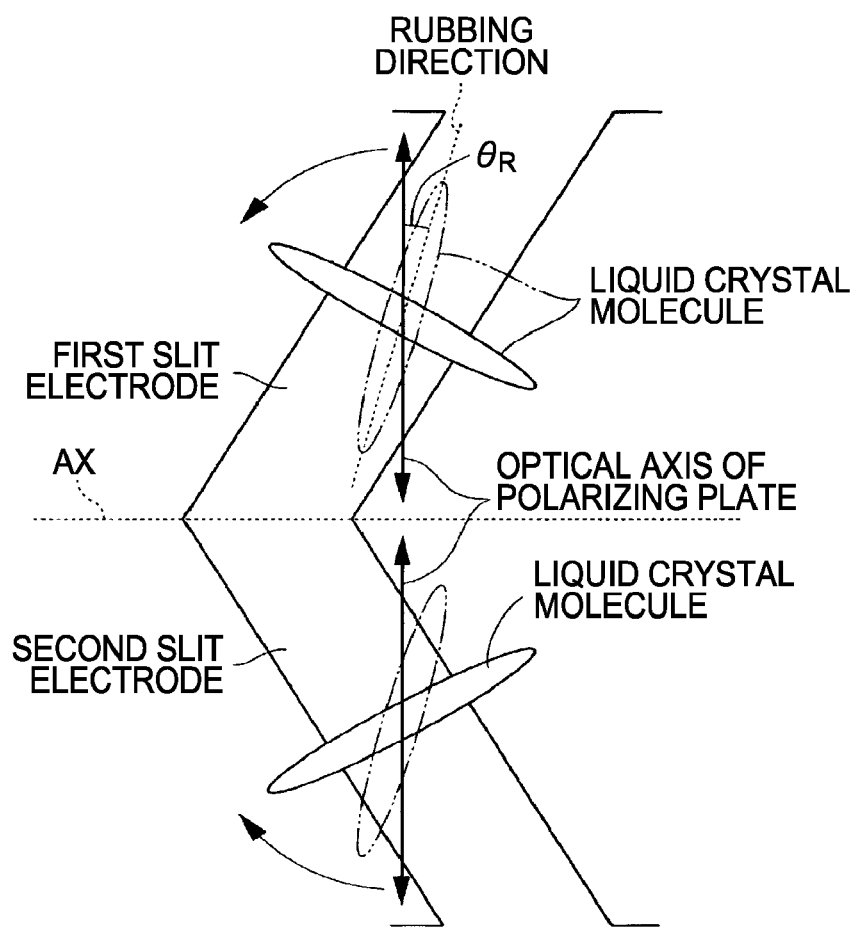
FIG. 9 is a plan view schematically illustrating an alignment state of liquid crystal molecules included in a known liquid crystal display device.

FIG. 8 is a perspective view illustrating a cellular phone 1300 which is an example of an electronic apparatus according to an embodiment of the invention. The cellular phone 1300 includes the liquid crystal display device according to the embodiment of the invention used as a small display unit 1301, and further includes a plurality of operation buttons 1302, an ear piece 1303, and a mouthpiece 1304. Since the cellular phone 1300 includes the liquid crystal display device of the embodiment described above, deterioration of display generated due to displacement between an optical axis of a polarizing plate and an alignment controlling direction of an alignment film is prevented. Accordingly, the cellular phone 1300 displays a high-quality image.

Note that the liquid crystal display device of the foregoing embodiment may be applicable to as an image display unit for an electronic book, a personal computer, a digital still camera, a liquid crystal television set, a video-tape recorder employing a viewfinder or a monitor directly viewed by a user, a car navigation device, a pager, a electronic notebook, a calculator, a word processor, a workstation, a television telephone, a POS terminal, or a device employing a touch panel. In any of the electronic apparatuses, a wide view angle and a narrow view angle are effectively switched from one to another, and accordingly, a high-quality image can be displayed.

The entire disclosure of Japanese Patent Application No. 2008-82821, filed Mar. 27, 2008 is expressly incorporated by reference herein.

What is claimed is:

1. A liquid crystal display device including a pair of substrates which face each other, a liquid crystal layer interposed between the substrates, and a plurality of sub-pixel regions,
wherein one of the substrates includes first electrodes arranged on a liquid crystal display side in the sub-pixel regions, second electrodes arranged on the first electrodes through insulation films so as to face the first electrodes, and a first alignment film arranged on a surface of the substrate which contacts the liquid crystal layer, the other of the substrates includes a polarizing plate arranged on a surface far from the liquid crystal layer, and a second alignment film arranged on a surface of the substrate which contacts the liquid crystal layer, each of the sub-pixel regions is divided into first to fourth display regions by a first axis which extends orthogonal to an optical axis of the polarizing plate and a second axis which extends orthogonal to the first axis, each of the first to fourth display regions includes a plurality of slit electrodes arranged on the second electrodes along the first axis, among the plurality of slit electrodes, first slit electrodes included in the first display region and second slit electrodes included in the second display region are symmetrically arranged with respect to the first axis, and third slit electrodes included in the third display region and fourth slit electrodes included in the fourth display region are symmetrically arranged with respect to the first axis, and the first slit electrodes and the fourth slit electrodes are symmetrically arranged with respect to the second axis, and the second slit electrodes and the third slit electrodes are symmetrically arranged with respect to the second axis.

2. The liquid crystal display device according to claim 1, wherein the plurality of slit electrodes are arranged with uniform intervals.

3. The liquid crystal display device according to claim 1, wherein the slit electrodes are configured by forming opening portions having slit shapes on the second electrodes, opening portions of the first slit electrodes and the opening portions of the second slit electrodes are connected to each other, and opening portions of the third slit electrodes and the opening portions of the fourth slit electrodes are connected to each other.

4. An electronic apparatus comprising the liquid crystal display device set forth in claim 1.

* * * * *